(12) United States Patent
Sylla et al.

(10) Patent No.: US 6,226,917 B1
(45) Date of Patent: May 8, 2001

(54) FISHING LURE SYSTEM

(75) Inventors: Brian P. Sylla; Randy A. Larson, both of River Falls, WI (US)

(73) Assignee: Outdoor Innovations, Inc., River Falls, WI (US)

( * ) Notice: Subject to any disclaimer, the term of this patent is extended or adjusted under 35 U.S.C. 154(b) by 0 days.

(21) Appl. No.: 09/375,669

(22) Filed: Aug. 17, 1999

(51) Int. Cl.$^7$ ............................ A01K 85/00; A01K 85/01

(52) U.S. Cl. ..................... 43/42.09; 43/17.6; 43/42.22

(58) Field of Search ........................... 43/17.5, 17.6, 43/42.09, 42.19, 42.22, 42.06, 44.99

(56) References Cited

U.S. PATENT DOCUMENTS

| | | | |
|---|---|---|---|
| D. 381,734 | 7/1997 | Murphy | D22/134 |
| 757,077 | * 4/1904 | Whipple | 43/17.6 |
| 765,482 | * 7/1904 | Hardy | 43/42.09 |
| 1,477,864 | 12/1923 | Bolton | 43/42.09 |
| 1,600,653 | 9/1926 | Steenstrup | 43/42.09 |
| 1,740,335 | 12/1929 | Cowan | 43/42.09 |
| 1,776,090 | 9/1930 | Shroyer | 43/42.09 |
| 2,127,761 | 8/1938 | Beck | 43/46 |
| 2,190,791 | 2/1940 | Larson | 43/44 |
| 2,217,565 | * 10/1940 | Seigle et al. | 43/17.6 |
| 2,309,521 | 1/1943 | Mabee | 43/46 |
| 2,458,611 | 1/1949 | Long | 43/44 |
| 2,467,244 | 4/1949 | Van Hee et al. | 43/46 |
| 2,485,087 | 10/1949 | Diamond | 43/49 |
| 2,529,642 | 11/1950 | Vaughn et al. | 43/42.32 |
| 2,573,399 | 10/1951 | Cannon | 43/42.36 |
| 2,573,592 | 10/1951 | Nickel | 43/42.09 |
| 2,592,445 | 4/1952 | McCarthy | 43/41 |
| 2,593,792 | 4/1952 | Reckler | 43/42.47 |
| 2,599,035 | 6/1952 | Wing | 43/42.33 |
| 2,638,697 | * 5/1953 | Schwartz | 43/17.6 |
| 2,663,112 | 12/1953 | McMillin | 43/42.09 |
| 2,694,877 | 11/1954 | Wise | 43/42.33 |
| 2,709,317 | * 5/1955 | Pease, Sr. | 43/44.99 |
| 2,719,382 | * 10/1955 | Schachte | 43/44.99 |
| 2,765,575 | * 10/1956 | Gfroerer | 43/44.99 |
| 2,884,732 | 5/1959 | Bailer | 43/42.33 |
| 2,897,623 | 8/1959 | Flournoy | 43/17.6 |
| 2,983,065 | * 5/1961 | Ferguson et al. | 43/42.09 |
| 2,996,826 | 8/1961 | Lamar | 43/42.32 |
| 3,031,792 | 5/1962 | Swenson | 43/42.2 |
| 3,069,801 | 12/1962 | Mills | 43/42.33 |

(List continued on next page.)

FOREIGN PATENT DOCUMENTS

| | | | |
|---|---|---|---|
| 2757998 | * 6/1979 | (DE) | 43/17.6 |
| 3718968 | * 12/1988 | (DE) . | |
| 4114851 | * 11/1992 | (DE) . | |
| 175240 | * 3/1986 | (EP) . | |
| 331518 | * 9/1989 | (EP) . | |
| 2-79924 | * 3/1990 | (JP) . | |
| WO 97/31217 | * 8/1997 | (WO) . | |

OTHER PUBLICATIONS

A copy of p. 11 of the Cabell's® Tackle Shop 1999 Fishing Specialty Catalog. Item G on p. 11 si the "Arc Minnow™".
Photocopies of the informational card for a Yo–Zuri® Arc Minnow™ which was purchased from Cabella's® Tackle Shop 1999 Fishing Specialty Catalog.
Photocopies showing the Arc Minnow™ crankbait from the top, bottom, and both sides.

*Primary Examiner*—Darren W. Ark
(74) *Attorney, Agent, or Firm*—Kinney & Lange, P.A.

(57) ABSTRACT

A fishing lure having a wire frame forming a receptacle which releasably receives and holds an elongated insert. The wire frame includes a first end and a second end. In one embodiment, the lure also includes an end cap having a cavity for releasably receiving the first end of the frame. A portion of the first end extends through the line cap. The lure also includes a hook end cap having a cavity for receiving the second end of the frame. The hood end cap includes an aperture. A portion of the second end of the wire frame extends through the aperture.

15 Claims, 5 Drawing Sheets

U.S. PATENT DOCUMENTS

| | | | |
|---|---|---|---|
| 3,077,046 | 2/1963 | Murray | 43/17.6 |
| 3,210,882 | 10/1965 | Purdom | 43/42.33 |
| 3,257,751 | 6/1966 | Benittinen et al. | 43/42.33 |
| 3,360,882 | 1/1968 | Belokin, Jr. | 43/42.33 |
| 3,423,868 | 1/1969 | Le Master | 43/42.33 |
| 3,528,188 | 9/1970 | Manross | 43/17.5 |
| 3,540,144 | 11/1970 | Gurka | 43/42.33 |
| 3,708,903 | 1/1973 | Bercz et al. | 43/17.6 |
| 3,861,072 * | 1/1975 | Holcombe | 43/17.6 |
| 3,863,380 | 2/1975 | Purlia | 43/42.49 |
| 3,895,455 | 7/1975 | Johnston | 43/17.6 |
| 3,921,328 | 11/1975 | Holcombe | 43/17.6 |
| 3,940,868 | 3/1976 | Northcutt | 43/17.6 |
| 3,969,839 | 7/1976 | Ziegler | 43/17.6 |
| 4,232,471 * | 11/1980 | Kolk et al. | 43/44.99 |
| 4,437,256 | 3/1984 | Kulak | 43/17.5 |
| 4,516,350 | 5/1985 | Malphrus | 43/17.6 |
| 4,581,839 | 4/1986 | Mattison | 43/17.6 |
| 4,589,221 | 5/1986 | Mattison | 43/17.6 |
| 4,610,103 | 9/1986 | Steinman | 43/17.6 |
| 4,638,584 | 1/1987 | Lindsay | 43/17.6 |
| 4,672,766 | 6/1987 | Mattison | 43/17.6 |
| 4,693,032 | 9/1987 | Mattison | 43/17.6 |
| 4,700,504 | 10/1987 | Mattison | 43/42.33 |
| 4,709,499 | 12/1987 | Ottaviano | 43/17.6 |
| 4,741,120 | 5/1988 | Cota et al. | 43/17.6 |
| 4,751,788 | 6/1988 | Mattison | 43/17.6 |
| 4,771,724 | 9/1988 | Baretz et al. | 116/202 |
| 4,777,756 | 10/1988 | Mattison | 43/17.6 |
| 4,800,670 | 1/1989 | Mattison | 43/17.6 |
| 4,823,497 | 4/1989 | Pierce | 43/17.6 |
| 4,839,983 | 6/1989 | Pippert | 43/42.06 |
| 4,879,831 | 11/1989 | Herrlich | 43/17.6 |
| 4,888,904 | 12/1989 | Douglas, Jr. | 43/17.6 |
| 4,959,919 * | 10/1990 | Rao et al. | 43/17.6 |
| 5,036,617 | 8/1991 | Waldrip | 43/41 |
| 5,043,851 | 8/1991 | Kaplan | 362/34 |
| 5,067,051 | 11/1991 | Ladyjensky | 362/34 |
| 5,157,857 | 10/1992 | Livingston | 43/17.6 |
| 5,195,266 | 3/1993 | Troescher | 43/17.6 |
| 5,213,405 | 5/1993 | Giglia | 362/34 |
| 5,224,285 | 7/1993 | Kamin et al. | 43/42.06 |
| 5,446,629 | 8/1995 | Steiger et al. | 362/34 |
| 5,495,690 | 3/1996 | Hunt | 43/17.6 |
| 5,552,968 | 9/1996 | Ladyjensky | 362/34 |

* cited by examiner

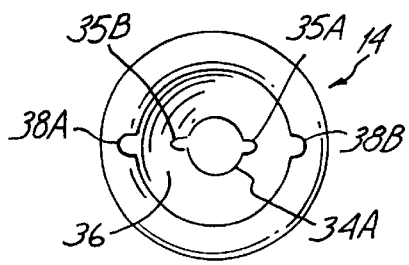
Fig. 3
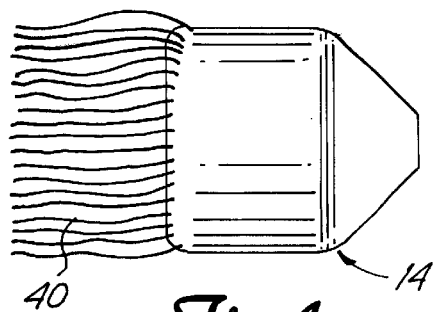
Fig. 4
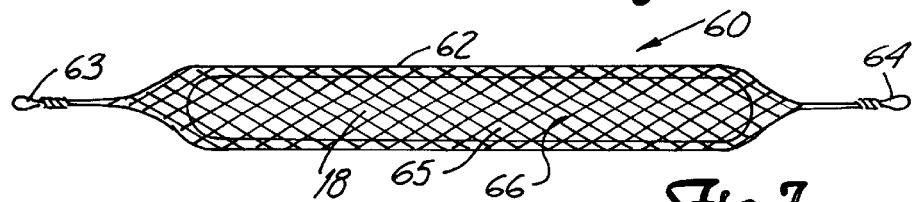
Fig. 7
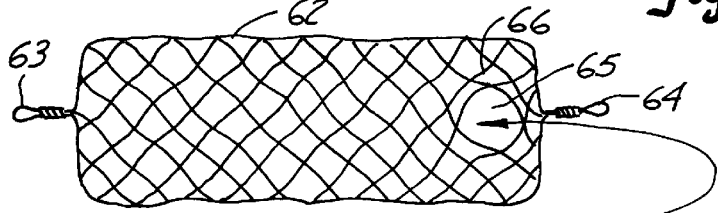
Fig. 8
Fig. 9
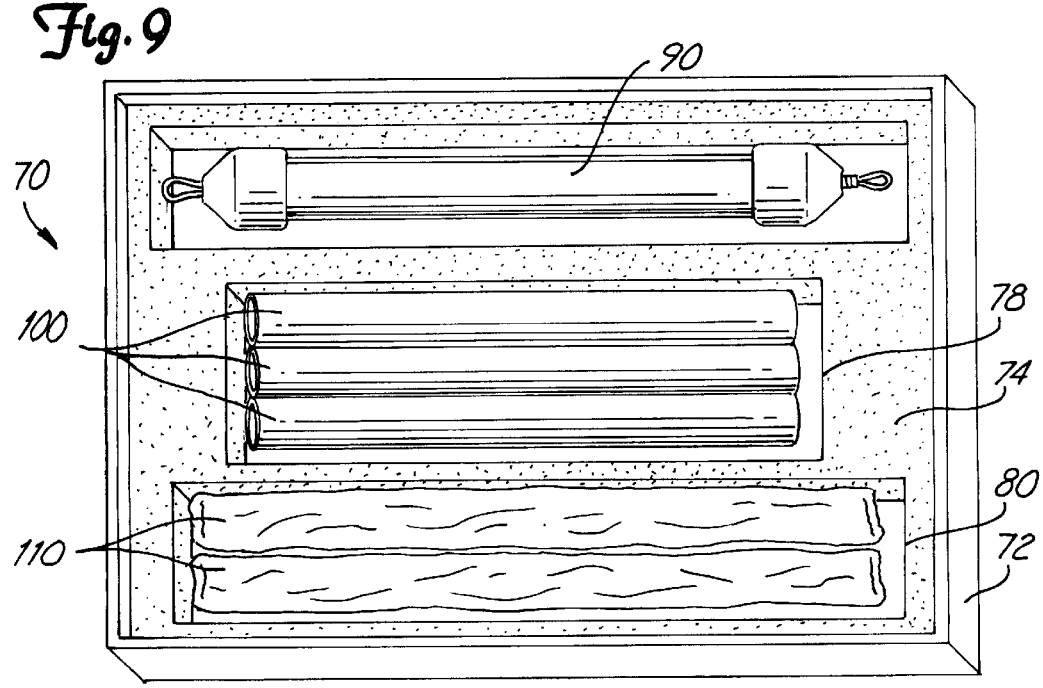

FISHING LURE SYSTEM

BACKGROUND OF THE INVENTION

The present invention relates to a fishing lure. In particular the present invention is a wire frame which carries a tubular insert element (such as a chemiluminescent or colored tube).

Fishing is among the most popular recreational sports. Anglers are of all ages and from virtually all walks of life. In the United States, it is estimated that between 40 and 60 million people go fishing every year. There is a never ending quest for more effective fishing lures. Lures of all shapes, colors, and sizes have been used in attempts to attract fish and increase fishing success. Fish can be attracted by the sight, sound, and smell of lures.

In the past, various attempts have been made to develop a lighted lure which would be useful in attracting fish during low light conditions. These conditions may occur during evening hours, during overcast days, and even on brightly lit days when water clarity is low. Examples of lighted fishing lures include the following patents: Bercz, et al. U.S. Pat. No. 3,708,903; Murphy U.S. Pat. No. Des. 381,734; Northcutt U.S. Pat. No. 3,940,868; Kulak U.S. Pat. No. 4,437,256; Malphrus U.S. Pat. No. 4,516,350; Cota, et al. U.S. Pat. No. 4,741,120; Douglas, Jr. U.S. Pat. No. 4,888,904; Kaplan U.S. Pat. No. 5,043,851; Ladyjensky U.S. Pat. No. 5,067,051; Livingston U.S. Pat. No. 5,157,857; Troescher U.S. Pat. No. 5,195,266; Giglia U.S. Pat. No. 5,213,405; Steiger, et al. U.S. Pat. No. 5,446,629; Hunt U.S. Pat. No. 5,495,690; and Ladyjensky U.S. Pat. No. 5,552,968.

BRIEF SUMMARY OF THE INVENTION

The fishing lure of the present invention may be used alone or in combination with other lures to form various lure styles including a crankbaits or jigs. More specifically, the fishing lure is a wire frame which can accommodate an elongated insert. The insert is releasably held in the wire frame. In preferred embodiments, the element is a chemiluminescent tube held in place by end caps attached on each end of the tube.

The fishing lure may be used alone or as part of a kit which includes a frame and a set of inserts. The inserts can include chemiluminescent tubes, as well as inserts which are not light emitting, but which have different colors and specific gravities. As a result, the same lure body can be modified to present different appearances, including those which are light emitting and those which operate at various depths. These variations in the lure inserts enable the lure to attract fish or trigger striking of the lure under a variety of different conditions.

BRIEF DESCRIPTION OF THE DRAWINGS

FIG. 3 is an end elevational view of one embodiment of an end cap of the present invention.

FIG. 4 is an alternate embodiment of an end cap of the present invention.

FIG. 7 is a side view of an alternate embodiment of the inventive fishing lure.

FIG. 8 is an exploded side view of the embodiment shown in FIG. 7.

FIG. 9 is a fishing lure kit which includes a lure and a set of tubular inserts.

DETAILED DESCRIPTION

Figure 1:
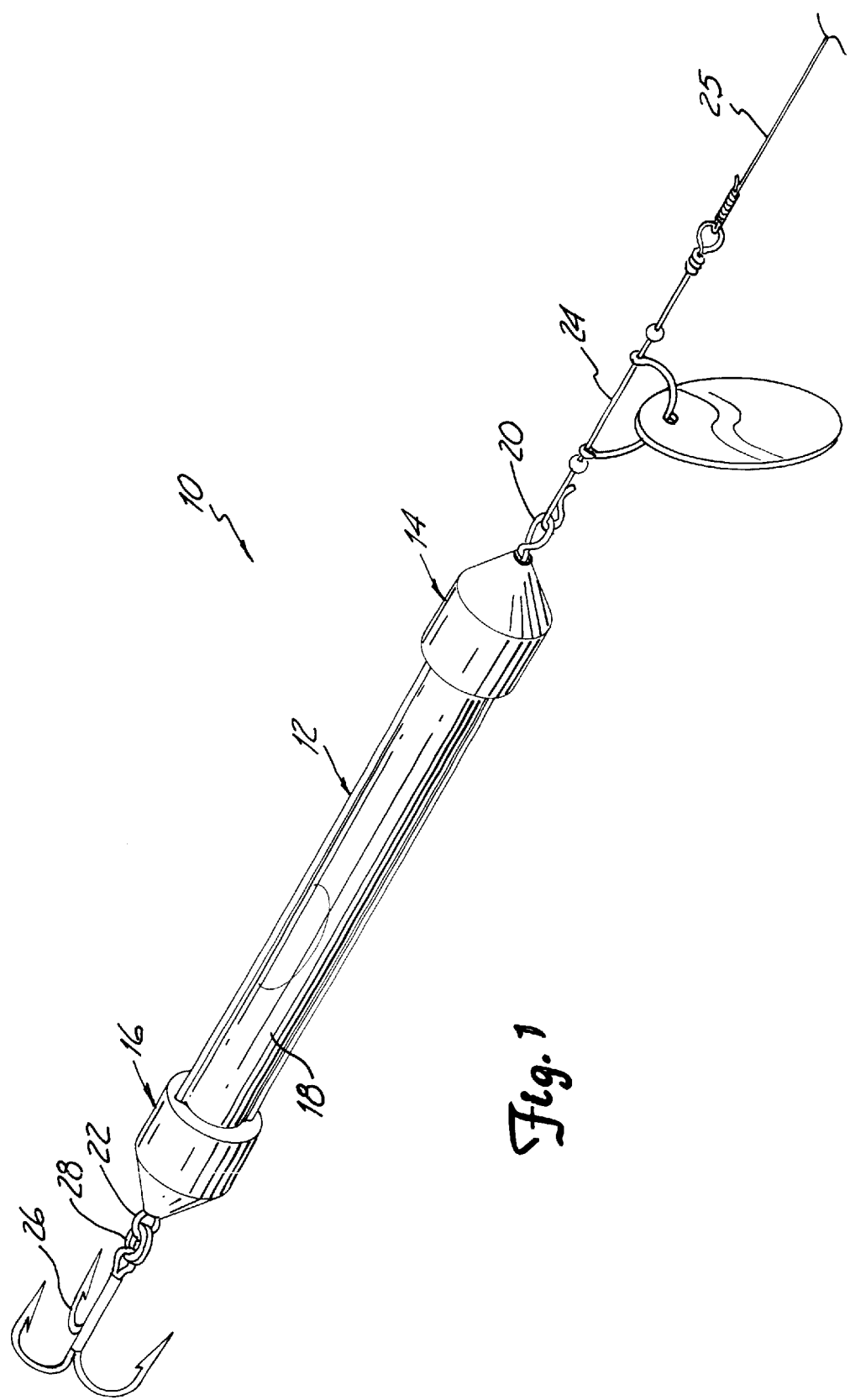
FIG. 1 is a perspective view of one embodiment of the fishing lure of the present invention.

FIG. 1 shows a first embodiment of the present invention frame fishing lure shown generally at 10. Frame fishing lure 10 includes wire frame 12, first end cap 14, second end cap 16 and chemiluminescent tube 18, front eyelet 20, and rear eyelet 22.

Chemiluminescent tube 18 is disposed within the wire frame 12. The wire frame 12 is formed so that a first leg 23A and a second leg 23B run longitudinally along the length of the tube 18. The legs 23A and 23B substantially conform with the shape of the tube 18. The first end cap 14 is positioned over the wire frame 12 so as to extend over a portion of the tube 18 disposed in the wire frame 12. The second end cap 16 is positioned over another portion of the tube 18 disposed in the wire frame 12. Using the frame 12 in this fashion to support the tube 18 exposes a large area of the tube 18, allowing the maximum amount of color and light to be presented to the fish. The tube 18 can easily be replaced from any number of commercial sources.

Chemiluminescent tubes are available from several sources and are available in different sizes and different colors. Typically, the chemiluminescent tube 18 is activated by bending the tube 18 until a snapping sound is heard, which breaks a seal separating two substances within the tube. The chemicals within the tube are then mixed by shaking the tube. Once activated, tube 18 is inserted within the wire frame 12. One form of chemiluminescent tube which has been used with the present invention is Cyalume® light stick from Omniglo Corp. Cyalume® is a registered trademark of American Cynamiad Co. Cyalume® light sticks are available in 1.5 inch (0.25 ml fluid) sizes in a number of different colors (including red and yellow). They are also available in larger 7.5 mm×75 mm size, which is used with larger lures.

Another chemiluminescent tube which can be used with the present invention is the Fire Fly light stick from Bandi Co., Ltd. Seoul, Korea.

Light emitted from chemiluminescent tube 18 provides additional color or flash to the lure, and is particularly advantageous in low light conditions caused either by lack of water clarity, weather conditions, or the time of day.

Colored tubes of varying sizes, which are not chemiluminescent, can also be inserted into wire frame 12. For example, under certain conditions a red, orange, chartreuse, silver, or copper colored tube can provide additional color to frame lure 10 which may attract fish or trigger strikes. Additionally, other types of tubular inserts may be used in place of chemiluminescent tube 18. Materials which have a variety of specific gravities may be used to vary the depth at which the lure runs. For example, balsa wood or an oil filled tube can create an insert which causes the lure to float on top of the water. A lead insert can be used to cause the lure to sink. Although the preferred embodiment is of a tube having a circular cross section, a variety of cross sections (including square and hexagonal) can be used. The present invention provides the flexibility of presenting different appearances with the same lure, as desired by the angler.

The front eyelet 20 is fashioned from the wire frame 12 and extends through the first end cap 14. Rear eyelet 22 is also fashioned from the wire frame 12, and extends through the second end cap 16. Additional lure components such as blade assembly 24 may be connected to the front eyelet 20 to produce a variety of lure styles which can vary according to the fisherman's wishes. Fishing line 25 is typically attached to the blade assembly 24 (or any other lure style) or to a snap swivel (not shown) connected to the front eyelet 20. A person skilled in the art would realize that the fishing line 25 could be attached to the inventive frame lure 10 in any number of ways. For example, multiple "accessory" lures could be attached to the front eyelet 20, and the fishing line 25 attached to one of the plurality of "accessory" lures. By combining a variety of lures with the inventive wire frame lure 10, lure styles including spinners, jigs, or floaters can be created. Connecting the blade assembly lure 24 to the front eyelet 20, helps to prevent the cap from sliding off the tube 18. The rear eyelet 22 is preferably used to connect a hook 26 to the lure 10. Alternatively, the rear eyelet 22 may be used to connect additional lure components, including crank baits and jigs to create various lure styles as described above. The rear eyelet 22 typically is connected to a split ring 26 which then is used to attach the hook 26 or additional lure components. Although the preferred embodiment uses wire to manufacture the frame 12, a person skilled in the art would realize any stiff thin material can be used for the frame 12 (e.g. plastic).

Figure 2:
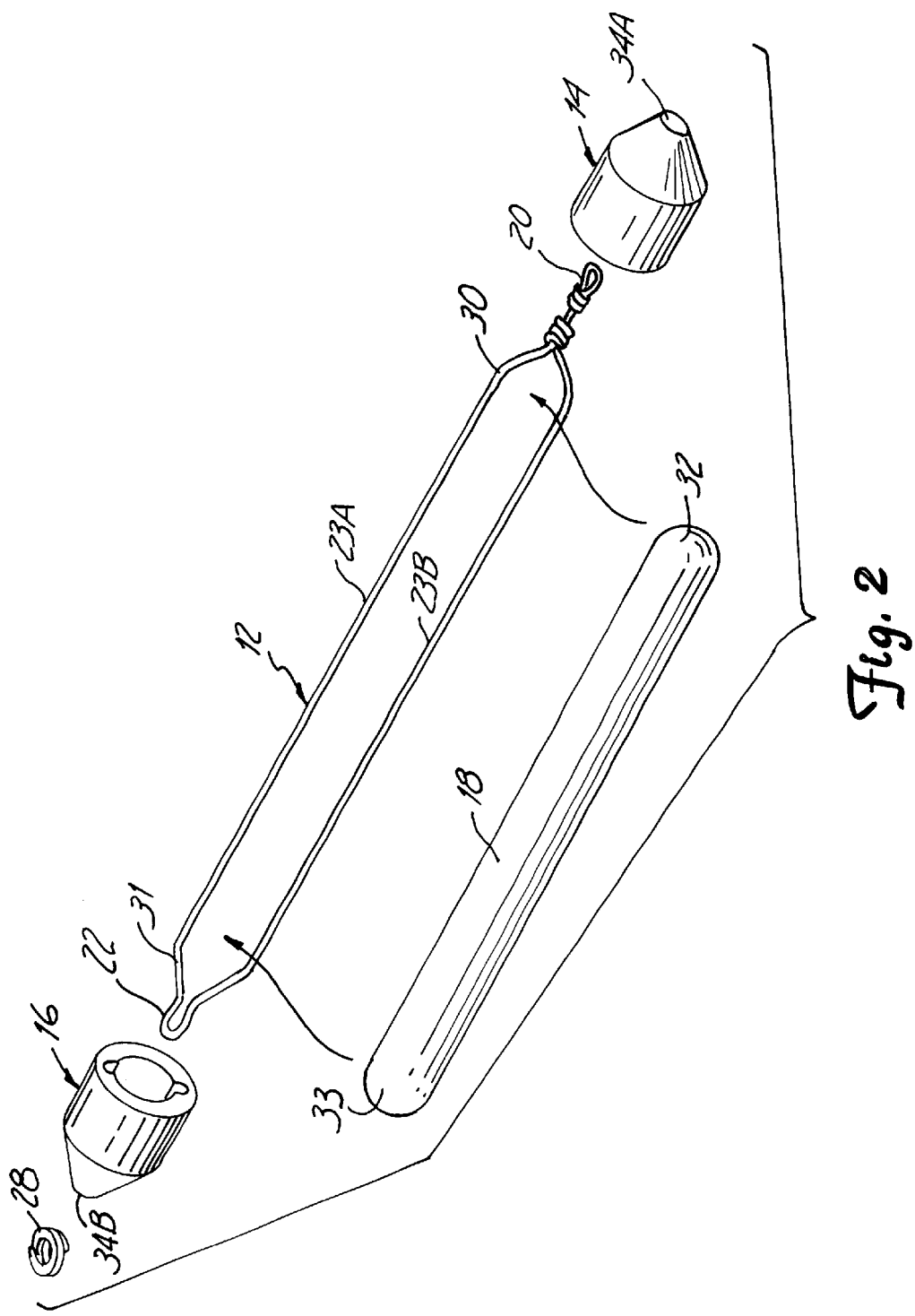
FIG. 2 is an exploded perspective view of the embodiment shown in FIG. 1.

FIG. 2 shows an illustration of how the tube 18 is inserted into the wire frame 12. The wire frame 12 consists of a front end 30 and a rear end 31. The tube 18 has a first end 32 and a second end 33. The tube 18 is disposed longitudinally within the frame 12. The first end 32 of the tube 18 is disposed proximate to the front end 30 and the second end 33 of the tube 18 is disposed proximate to the rear end 31. The first end cap 14 is then slid over the front end 30 of the wire frame 12 so as to fit over a portion of the chemiluminescent tube 18. The front eyelet 20 extends through an aperture 34A in the first end cap 14. The second end cap 16 is disposed over the rear end 31 of the wire frame 12 and a second portion of the chemiluminescent tube 18. The rear eyelet 22 extends through an aperture 34B in the second end cap 16. The split washer 28 is then attached to the rear eyelet 22. The first end cap 14 and the second end cap 16 are held in place by a friction fit between the end caps 14 and 16 and the tube 18. The split washer 28 "locks" the second end cap 16 into place by preventing the rear eyelet 22 from being pulled back through the aperture 34B in the second end cap 16. Although it is not illustrated, a person skilled in the art would realize that the split ring 26 can be placed on the front eyelet 20 as well.

FIG. 3 is an inside end view of first end cap 14. This end cap is representative of all end caps illustrated in FIGS. 1, 2, 5 and 6. End caps 14 and 16 are typically manufactured by injection molding polycarbonate plastic, however, other materials such as aluminum, steel or lead may be used. First end cap 14 includes the aperture 34A which allows passage of the front eyelet 20 of the wire frame 12 (see FIG. 2). Typically, two slots 35A and 35B are disposed on opposite sides of the aperture, serving as guides to the first leg 23A and the second leg 23B. Although slots 35A and 35B are shown in FIG. 3., a person skilled in the art would realize alternate embodiments of the inventive fishing lure 10 may exist which do not utilize slots 35A and 35B. A cavity 36 is formed in end cap 14 which allows for the wire frame 12 and the chemiluminescent tube 18 to be disposed therein. Notches 38A and 38B are disposed into opposing sides of the cavity 36. These notches 38A and 38B are positioned so as to receive the wire frame 12 while still maintaining a tight friction fit between the end cap 14 and the tube 18 and typically are positioned radially from slots 35A and 35B.

The frame lure 10 may be provided with various accessories that are commercially available. For example, buck tail 40 may be added to the first end cap 14 as shown in FIG. 4. Using interchangeable end caps 14 and 16 allows various effects to be achieved by the inventive lure 10. For example, differently colored bucktail or differently colored end caps may be used. Additionally, bucktail may be positioned between the tube 18 and the end cap 14. A person skilled in the art would realize that other common lure accessories may be added in this fashion to the fishing lure 10.

Figure 5:
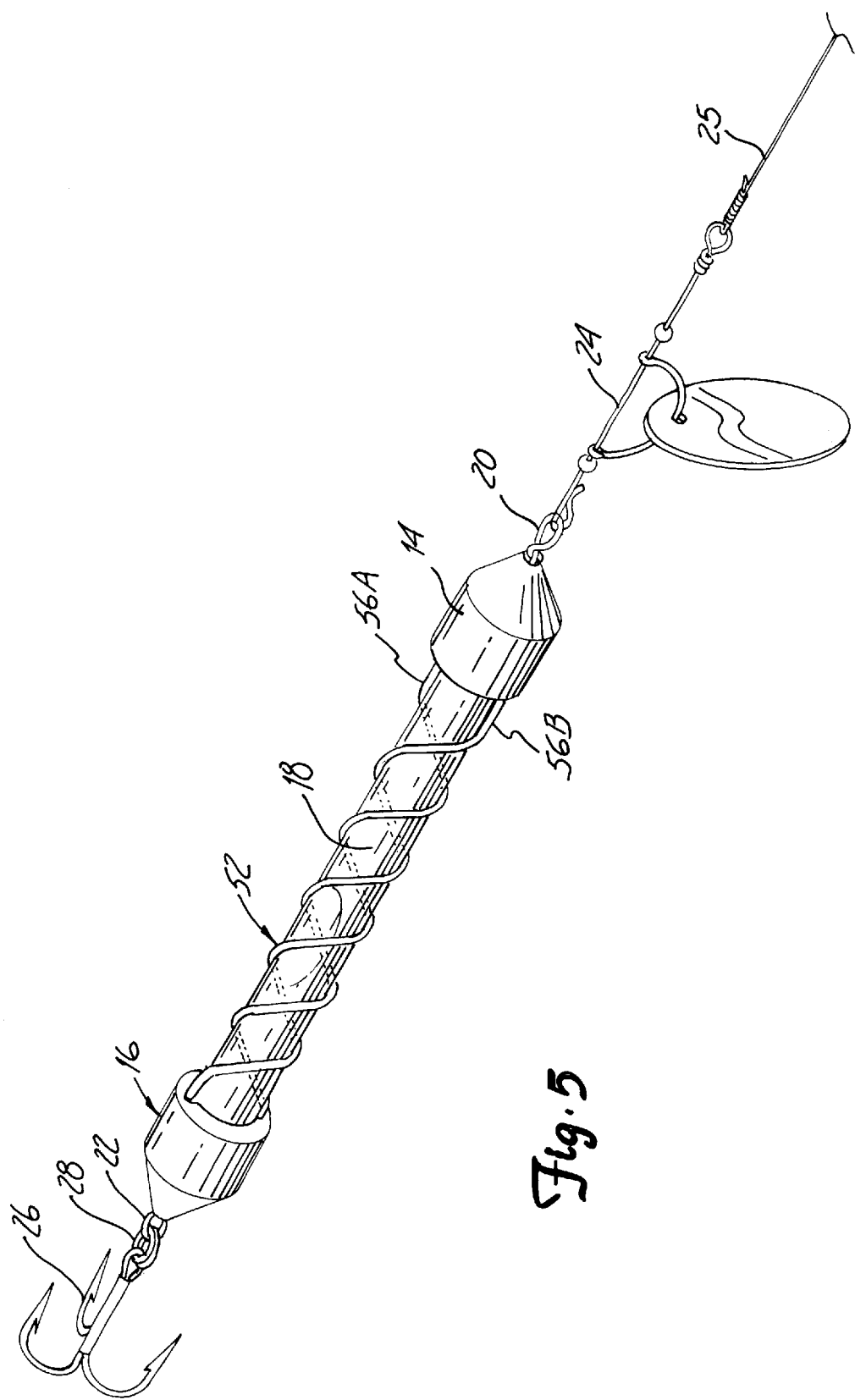
FIG. 5 is a perspective view of an alternate embodiment of the inventive fishing lure.
Figure 6:
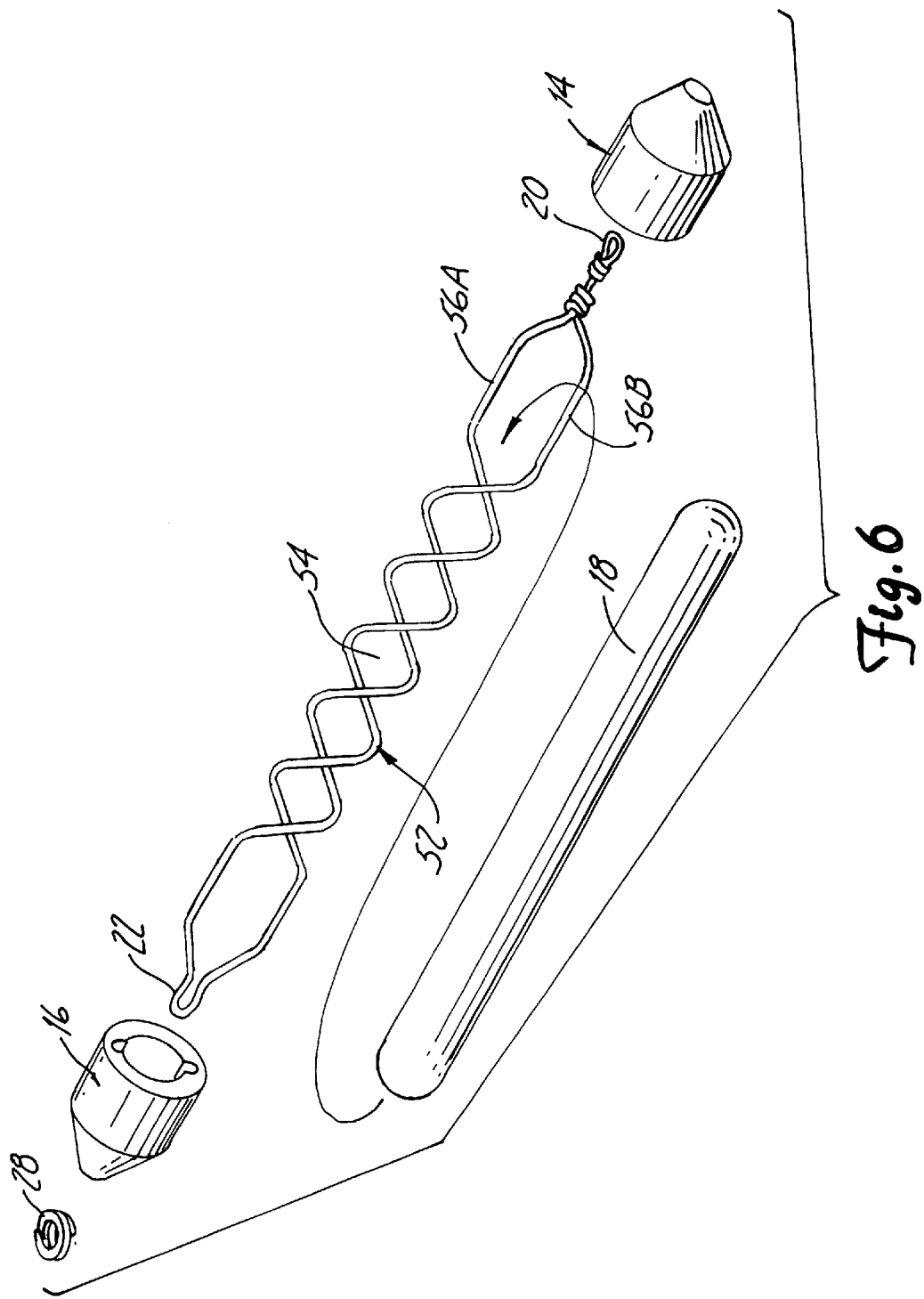
FIG. 6 is an exploded perspective view of the embodiment shown in FIG. 5.

An alternate embodiment of the inventive frame fishing lure 50 is shown in FIG. 5. In this embodiment, the frame lure 50 utilizes a helical wire frame 52. The end caps 14 and 16 and the eyelets 20 and 22 are identical to those utilized in the inventive fishing lure 10, as illustrated in FIG. 1. The helical wire frame 52 maintains the chemiluminescent tube 18 between the end caps 14 and 16. When the fisherman wishes to remove the tube 18 from the fishing lure 50, he or she removes one or both of the end caps 14 and 16 as shown in FIG. 6. After the end caps 14 and 16 are removed, the chemiluminescent tube 18 is slid out of a hollow area 54 formed by the braided wire frame 52. A first leg 56A and a second leg 56B form helixes around the tube 18. This embodiment of the invention provides more support for the tube 18, while covering a small amount more surface area of the tube 18 than the embodiment shown with respect to FIGS. 1 and 2.

Another embodiment of the inventive frame fishing lure 60 is shown in FIG. 7. The lure 60 uses a braided sock frame 62. The frame 62 is a flexible wire mesh. The tube 18 is disposed inside the mesh frame 62 and a front eyelet 63 and a rear eyelet 64 are fixably attached to opposite ends of the mesh frame 62. Gaps 65 exist between wires 66 that form the mesh. When the front eyelet 63 and the rear eyelet 64 are attached to the hook, the wire mesh 62 is pulled along its longitudinal axis. The wires 66 are pulled taut, and the gaps 65 maintain a fixed area smaller than the cross sectional area of the tube 18.

To remove the tube 18, tension on the eyelets 63 and 64 is released, and the wires 66 which form the braided frame 62 become flexible, as shown in FIG. 8. One of the gaps 65 existing between the wires 66 can be expanded by flexing the wires 66 surrounding the gap 65. The tube 18 is inserted through the gap 65 forcing the gap 65 to expand to accommodate the cross-sectional area of the tube 18. In the optimal embodiment of the lure 60, the braided frame 62 is made slightly longer than the tube 18. To position the tube 18 inside the mesh 62, the selected gap 65 is disposed proximate to either the front eyelet 63 or the rear eyelet 64.

FIG. 9 shows an alternate embodiment of the present invention in the form of a fishing lure kit 70. The kit 70 includes a container 72 with foam liner 74 having cutout sections 76, 78, and 80.

Fishing lure 90, which for example may be any one of the forms illustrated in FIGS. 1–8 is positioned within cutout 76. Cutout 78 contains a number of different colored tubes 100. The tubes may be, for example, chartreuse, copper, red, yellow, and silver, or may be a wide variety of other colors. The tubes may additionally be manufactured from materials having a variety of specific gravities. Cutout 80 provides a storage space for sealed packages 110 which contain chemiluminescent tubes.

The present invention provides a simple and effective way to vary the appearance and operating depth of a fishing lure as needed and dictated by different fishing conditions. Different colors of inserts can provide a different appearance which may more closely match the appearance of bait fish in the body of water being fished, or may provide a color which triggers a strike because of lighting and water clarity conditions. Variations in operating depths can also trigger strikes depending on variables such as water temperature and rising or falling water levels. The use of chemiluminescent tube inserts can provide for an increased visibility or flash to the lure in low light or poor water clarity conditions. Changes to the lure are made quickly and easily using the inserts without the need to retie a new lure.

Although the present invention has been described with reference to preferred embodiments, workers skilled in the art will recognize that changes may be made in form and detail without departing from the spirit and scope of the invention.

What is claimed is:

1. A fishing lure comprising:
   a wire frame having a first end and a second end;
   line end cap having a cavity for releasably receiving the first end of the frame, a portion of the first end of the wire frame extending through the line end cap;
   a hook end cap having a cavity for receiving the second end of the frame, a portion of the second end of the wire frame extending through the hook end cap wherein the wire frame, the line end cap and the hook end cap form a receptacle; and
   an elongated insert releasably disposed in the receptacle, the insert having a first end positioned in the line end cap and a second end positioned in the hook end cap.

2. The fishing lure of claim 1 wherein the frame is constructed so that a portion of the insert is disposed outside the line end cap and the hook end cap and is exposed on all sides.

3. The fishing lure of claim 1 wherein at least one of said line end cap and said hook end cap has a buckettail attachment.

4. The fishing lure of claim 1 wherein the insert is a chemiluminescent element.

5. The fishing lure of claim 1 wherein the insert has a specific gravity of less than 1.0.

6. The fishing lure of claim 1 wherein the insert has a specific gravity of greater than 1.0.

7. The fishing lure of claim 1 wherein the insert is a colored tubular element.

8. The fishing lure of claim 1 wherein the wire frame is shaped to form a helix and the insert is disposed inside the helix.

9. The fishing lure of claim 1 wherein the wire frame is shaped to form a double helix and the insert is disposed inside the double helix.

10. A fishing lure comprising:
    a wire frame forming a receptacle, the wire frame having a first end and a second end;
    an elongated insert releasably disposed in the receptacle, wherein the insert has a specific gravity of less than 1.0;
    a line end cap having a cavity for releasably receiving the first end of the frame, a portion of the first end of the wire frame extending through the line end cap; and
    a hook end cap having a cavity for receiving the second end of the frame, a portion of the second end of the wire frame extending through the hook end cap.

11. A fishing lure comprising:
    a wire frame forming a receptacle, the wire frame having a first end and a second end;
    an elongated insert releasably disposed in the receptacle, wherein the insert is a chemiluminescent element;
    a line end cap having a cavity for releasably receiving the first end of the frame, a portion of the first end of the wire frame extending through the line end cap; and
    a hook end cap having a cavity for receiving the second end of the frame, a portion of the second end of the wire frame extending through the hook end cap.

12. A fishing lure kit comprising:
    a wire frame having a first end and a second end;
    a line end cap having a cavity for releasably receiving the first end of the frame, a portion of the first end of the wire frame extending through the line end cap;
    a hook end cap having a cavity for receiving the second end of the frame, a portion of the second end of the wire frame extending through the hook end cap wherein the wire frame, the line end cap and the hook end cap form a receptacle; and
    a plurality of different elongated inserts releasably disposable in the receptacle, each insert having a first end positionable in the line end cap and a second end positionable in the hook end cap.

13. The fishing lure kit of claim 12 wherein the inserts include a chemiluminescent element.

14. The fishing lure kit of claim 12 wherein the inserts include a plurality of different colored elements.

15. The fishing lure kit of claim 12 wherein the frame is constructed so that a portion of the insert is disposable outside the line end cap and the hook end cap and is exposed on all sides.

* * * * *

UNITED STATES PATENT AND TRADEMARK OFFICE
CERTIFICATE OF CORRECTION

PATENT NO.    : 6,226,917 B1  
DATED         : May 8, 2001  
INVENTOR(S)   : Brian P. Sylla et al.

It is certified that error appears in the above-identified patent and that said Letters Patent is hereby corrected as shown below:

<u>Column 5,</u>
Line 21, insert -- a -- before "line end cap"

Signed and Sealed this

Twenty-first Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,226,917 B1
DATED : May 8, 2001
INVENTOR(S) : Brian P. Sylla et al.

It is certified that error appears in the above-identified patent and that said Letters Patent is hereby corrected as shown below:

<u>Title page,</u>
Item [73], Assignee, delete "Outdoor Innovations, Inc."

Signed and Sealed this

Eighth Day of April, 2003

JAMES E. ROGAN
*Director of the United States Patent and Trademark Office*